United States Patent
Shigematsu et al.

[19]

[11] Patent Number: 6,120,919
[45] Date of Patent: Sep. 19, 2000

[54] MAGNETIC HEAD

[75] Inventors: Satoshi Shigematsu, Kawasaki; Takao Imagawa, Mito; Koichi Nishioka, Hiratsuka; Hiroshi Kamio, Odawara; Katsuhisa Usami, Hitachi, all of Japan

[73] Assignee: Hitachi, Ltd., Tokyo, Japan

[21] Appl. No.: 09/114,946

[22] Filed: Jul. 14, 1998

[30] Foreign Application Priority Data

Jul. 15, 1997 [JP] Japan .................................. 9-189454

[51] Int. Cl.[7] ...................................................... G11B 5/66
[52] U.S. Cl. .................. 428/692; 428/694 R; 428/694 T; 428/694 TS; 428/694 TM; 428/900; 360/113; 338/32 R; 324/252
[58] Field of Search .......................... 428/694 T, 694 TS, 428/694 TM, 900; 338/32 R; 360/113; 324/252

[56] References Cited

U.S. PATENT DOCUMENTS

| 5,206,590 | 4/1993 | Dieny ....................................... 324/252 |
| 5,549,978 | 8/1996 | Iwasaki .................................... 428/692 |
| 5,648,885 | 7/1997 | Nishioka et al. ....................... 360/113 |

FOREIGN PATENT DOCUMENTS 4-358310  12/1992  Japan .

Primary Examiner—Leszek Kiliman
Attorney, Agent, or Firm—Mattingly, Stanger & Malur

[57] ABSTRACT

Magnetoresistive and spin valve heads have a layered structure. Common to each of the layered structures of these heads is the combination of a soft-magnetic layer of essentially NiFe near a spacer layer of essentially Ta, which is used for insuring (111) crystal orientation of the NiFe layer. An isolate layer is interposed between the spacer layer and the soft-magnetic layer to prevent a diffusion boundary from being created at the interface of these layers which tends to degrade the soft-magnetic property of the NiFe layer, especially when the thickness of the soft-magnetic layer is 10 and nm or less. The isolate layer is one of a composition in which the principal component is a magnetic element that is not solid soluble with Ta, a composition in which the principal component is a non-magnetic element that is not solid soluble with Ni and Fe, a composition in which the principal component is at least one of the elements of Co, Fe, Ti, V, Zr, Nb, Mo, Hf, W, Tc, Ru, Rh, Pd, Ag, Re, Os, Ir, Pt and Au; or a composition in which the principal component is of $Co_{(100-x)}Fe_{(x)}$, where $20 \geq X > 0$. The isolate layer has a structure that is amorphous, an fcc structure.

25 Claims, 5 Drawing Sheets

MAGNETIC HEAD

FIELD OF THE INVENTION

The present invention relates to a magnetoresistive head and a spin valve head and more particularly to a magnetoresistive head and a spin valve head in which noise is reduced and magnetic properties are improved by preventing the deterioration of the soft-magnetic property of the magnetic heads.

BACKGROUND OF THE INVENTION

In recent magnetic disk devices, an inductive thin film head for recording data and a magnetic head element for reproducing data are provided, and the linear density and track density have been increased to improve areal recording density. A magnetoresistive head and a spin valve head have been proposed as the data reproducing magnetic head element in order to achieve such increases in recording density.

For example, a magnetic head mounted with a magnetoresistive head element comprises, as is illustrated by FIG. 9, a reproducing head 83 that is a magnetoresistive head element and a recording head 81 that is the inductive thin film head element and these are separated by a magnetic shield 84 and laminated.

The reproducing head includes the magnetoresistive head element (MR element) that is sandwiched by the magnetic shields 84, a sensor part 86, a pair of electrodes 89 for flowing sensing current through the sensor part 86 and a pair of permanent magnets 85 for reducing the Barkhausen noise of the MR element. The data is reproduced by moving the magnetic disk with respect to the head so that a sensing current flows through sensor part 86 from the pair of the electrodes 89. Very small changes in the magnetic field signals on the magnetic disk are detectable through the resistance changes of the sensor part 86.

The sensor part includes several layers, as is illustrated by FIG. 1A. In the figure, a layer 51 is the magnetoresistive element. A transverse bias layer 54 is a soft adjacent layer (SAL) that applies a transverse bias to the MR layer 51. A spacer layer 53 magnetically separates the transverse layer 54 and the MR layer 51. Also, an under part gap layer 55 and an under part shield layer 56 are arranged under the transverse bias layer 54.

The principal component of the spacer layer 53 is Ta, which is used as the principal component since it provides for preferred orientation of the crystals of the MR element 51. The under part shield layer 56 corresponds to shield 84 as shown in FIG. 9. The under part shield layers described hereinafter correspond to similar components as these.

The magnetoresistive head element operates based on the anisotropic magnetoresistive (AMR) effect wherein the resistance of the MR layer 51 changes in proportion to the square of the cosine of an angle between the direction of the magnetization of the MR layer 51 and the direction of the sense current. The MR head element (hereinafter, MR head) outputs a signal utilizing the change in resistance in the MR element through which the sense current flows in a constant direction, based on the characteristic that the magnetization and the resistance of the MR head changes due to the change in magnetic field from the magnetic recording media.

Therefore, the MR layer should have an excellent soft-magnetic property in order to obtain a large AMR effect for the head with low noise and high output level. For the MR layer, an alloy layer of Co, Fe and Ni is used and an NiFe alloy is preferred since it has a superior soft-magnetic property.

To improve the soft-magnetic property of the NiFe alloy, as is illustrated by FIG. 1A, the spacer layer 53, of which the principal component is Ta, is arranged on the transverse bias layer 54. The reason Ta is used as the principal component for the spacer layer 53 is that it is easier to obtain proper orientation of the crystals of the layer 51, which is essentially NiFe, than it is with any other materials.

In another prior art head arrangement, as illustrated by FIG. 1B, the order of the layers is inverted with respect to the under part gap layer 55 and the under part shield layer 56. In particular, the figure shows an order in which the transverse bias layer 61, a spacer layer 53 which is essentially of Ta, an MR layer 51 and an underlayer 65 which is essentially of Ta, are arranged on the under part gap layer 55 and the under part shield layer 56. Under layer 65 is provided to help the orientation of the crystals of MR layer 51.

Recently, a spin valve (SV) head has been developed as a reproducing head for attaining a higher recording density that has a giant magnetoresistive (GMR) effect. A GMR head can output a larger signal as compared with an MR head.

As shown in FIG. 2, only the sensor part of the structure of the SV head is different from that of the MR head. The sensor part of the SV head has a structure in which between pinned layer 72 and free layer 74, which are made of a ferromagnetic material such as NiFe, is a nonmagnetic layer 73 that is made of a metallic, nonmagnetic material, such as Cu.

In an SV head, the resistance changes in proportion to the cosine of the angle between the directions of the magnetization of the pinned layer 72 and the free layer 74. To obtain a linear output, it is necessary for the direction of the magnetization of the pinned layer 72 to be fixed by the adjoining antiferromagnetic layer 71, which is essentially FeMn. Also, the direction of the magnetization of the free layer 74 must be perpendicular to the direction of the magnetization of the pinned layer at the biased state.

In an SV head, the free layer 74 is required to be of a high quality soft-magnetic material layer for outputting signals with the rotation of magnetization corresponding to the magnetic signal field from the magnetic disk. Accordingly, the free layer of the SV head, similar to the case for the MR head uses an NiFe layer with a Ta underlayer. The free layer 74 is not limited to the single layer of the NiFe material, however, and a two-layer structure of a CoFe layer on a NiFe layer can also be used.

In the manufacturing process of the SV head, two steps or more of heat treatments in a magnetic field are necessary. These heat treatment steps are for ensuring that the directions of magnetization between the free layer 74 and the pinned layer 72 are perpendicular to one another. In particular, one of the heat treatments is for the magnetic polarization of the free layer 74, during which the direction of an applied magnetic field is set to be along the easy axis of magnetization of the free layer. The other heat treatment is for the magnetic polarization of the pinned layer 72, during which the direction of the applied magnetic field is set perpendicular to the easy axis of the magnetization of the free layer 74.

Thus, the free layer of the SV head is heat treated twice or more under the application of an applied magnetic field in a direction along the easy axis of magnetization of the free layer and in a direction perpendicular to it. To obtain an SV head with low noise levels, the angular dispersion of the magnetic anisotropy of the free layer must be kept to a minimum after the heat treatments.

Further, the MR layer or free layer must be made as thin as possible to obtain high sensitivity, which can be achieved by any suitable technique, such as by sputtering. The preferred thickness for the MR layer is about 10 to 15 nm and for the free layer of the SV head is about 5 to 10 nm of the soft ferromagnetic material, such as NiFe.

Although the SV head has been described generally with reference to FIG. 2, its construction is well known from the prior art, for example as described in Japanese patent publication 4-358310.

SUMMARY OF THE INVENTION

As described, in the MR head and the SV head of the prior art, it is preferable to have a thin film of a ferromagnetic material, such as NiFe or other suitable magnetic materials as the MR layer and the free layer, respectively, with an adjacent layer or underlayer of a suitable material, such as Ta. By investigating these layers, the inventors have determined that there is mutual diffusion between the atoms of the NiFe layer and the Ta layer when the NiFe layer is of a thickness of about 10 nm or less that is caused by the heat treatment(s) in the manufacturing of the heads with the result that the soft-magnetic property of the NiFe layer is deteriorated.

FIG. 3 shows the distribution of elements at the boundary between the Ta layer and the NiFe layer in the direction of the thickness of a layer by using Electron Energy Loss Spectroscopy. As illustrated by the figure, it is understood that a diffusion area is generated at the boundary between the NiFe layer and the Ta layer where the NiFe and the Ta are mixed (shown by the arrows) by an attracting force.

It has been determined that the deterioration of the soft-magnetic property is not a problem for an NiFe layer of a thickness of 10 nm or more since the ratio of the thickness of the diffusion layer to the thickness of the NiFe layer is smaller than that for when the NiFe layer is less than 10 nm. Accordingly, for a NiFe layer with a thickness of less than 10 nm, the soft-magnetic property degradation caused by the diffusion area cannot be neglected.

Therefore, in the MR head and the SV head of the prior art, when the NiFe layer is used for the soft-magnetic layer and the Ta underlayer is used for increasing the (111) orientation of the NiFe layer, the mutual diffusion at the boundary between the NiFe layer and the Ta layer is caused by the heat treatment(s) in the manufacturing of the heads. Thus, a problem exists that the soft-magnetic property of the NiFe layer is deteriorated near the boundary between the NiFe layer and the Ta layer. The mutual diffusion area can also be generated by the sputtering of the NiFe layer on the Ta layer, when sputtering deposition is used, and up to about 1 nm of mixing of the layers can be caused in this manner.

Thus, in the MR and SV heads of the prior art, there is a problem that when the layer thickness of the MR layer and the free layer of the MR element and SV element, respectively, is made thinner to obtain high sensitivity, the ratio of the thickness of the diffusion area to the ferromagnetic layer is increased. Accordingly, the desired soft-magnetic property cannot be obtained.

An objective of the present invention is to overcome the deterioration of the soft magnetic property found in the MR and SV heads of the prior art and to provide a magnetoresistive head and a spin valve head that does not experience deterioration of the soft-magnetic property at the diffusion area due to the heat treatment steps and due to the sputtering deposition steps, when involved, that are employed in the manufacturing process of the respective MR and SV elements. Accordingly, the MR and SV heads provided according to the invention that have low noise and preferred magnetic properties.

For achieving this and other objectives of the present invention, according to one aspect thereof, an isolate layer is arranged between a first layer and a second layer of a magnetoresistive head that has a layered structure wherein a main component of the first layer is essentially NiFe and a main component of the second layer is essentially Ta.

According to a second aspect of the present invention, an isolate layer is arranged between the magnetoresistive layer and the spacer layer of a magnetoresistive head that has a layered structure, wherein a main component of the magnetoresistive layer is essentially NiFe, and the spacer layer is adjacent the transverse bias layer that applies the transverse bias to the MR layer. The spacer layer separates the MR layer and the transverse bias layer and has a main component of essentially Ta.

According to a third aspect of the present invention, the isolate layer is arranged between the magnetoresistive layer and the underlayer of an MR head that has a layered structure. The main component of the MR layer is essentially NiFe, and the main component of the underlayer is essentially Ta. The underlayer may be a separate layer or the substrate for the magnetoresistive layer. The MR head also has a transverse bias layer that applies the transverse bias to the magnetoresistive layer.

According to a fourth aspect of the present invention, the isolate layer is arranged between the free layer and the underlayer of an SV head that has a layered structure, wherein an antiferromagnetic layer is adjacent a pinned layer that has a main component of a ferromagnetic material, and wherein the free layer has a principal component of a ferromagnetic material that is essentially NiFe. The SV head also has a nonmagnetic, metallic layer that is arranged between the pinned layer and the free layer. The underlayer is essentially Ta in this embodiment.

According to a fifth aspect of the present invention, in an MR or SV head of the present invention according to any one of the foregoing aspects, an isolate layer is used that is one of a composition in which the principal component is a magnetic element that is not solid soluble with Ta, a composition in which the principal component is a non-magnetic element that is not solid soluble with Ni and Fe, a composition in which the principal component is at least one of the elements of Co, Fe, Ti, V, Zr, Nb, Mo, Hf, W, Tc, Ru, Rh, Pd, Ag, Re, Os, Ir, Pt and Au; or a composition in which the principal component is of $Co_{(100-x)}Fe_{(x)}$, where $20 \geq X > 0$.

Hf, Zr and Sn are examples of nonmagnetic elements that are not solid soluble with Ni and Fe. Each is useable as the principle component for the composition of the isolate layer, as mentioned above.

DETAILED DESCRIPTION OF THE PREFERRED EMBODIMENTS

A detailed description of the preferred embodiments of the present invention follows, with respect to the disclosure of a magnetoresistive head (MR head) and a spin valve head (SV head), as shown in the accompanying figures.

The present invention involves the following principles.

Figure 1A:
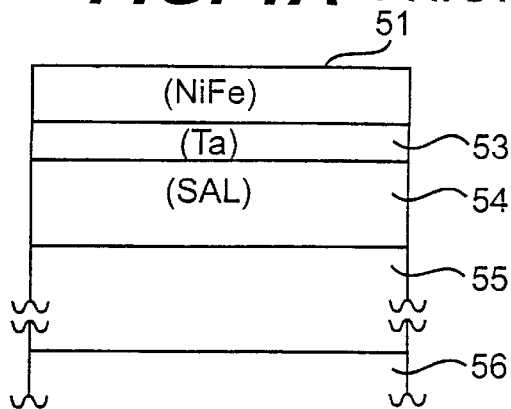
FIG. 1A is a representative cross sectional diagram showing the layer structure of an MR head of the prior art.
Figure 1B:
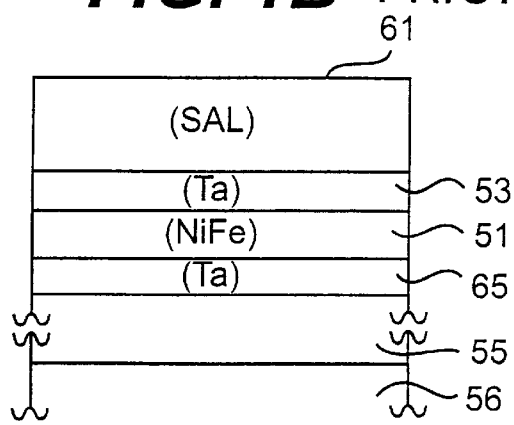
FIG. 1B is a representative cross sectional diagram showing the layer structure of another MR head of the prior art.
Figure 2:
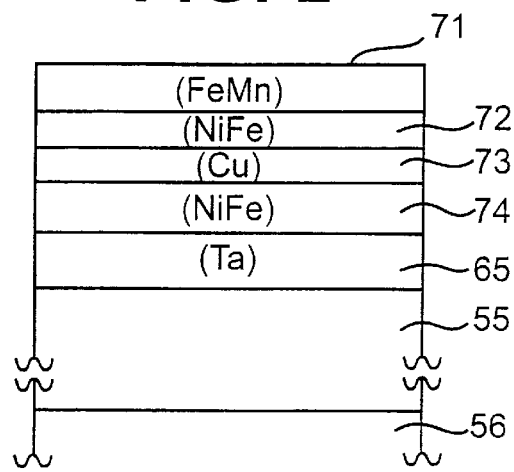
FIG. 2 is a representative cross sectional diagram showing the layer structure of a spin valve head of the prior art.
Figure 3:
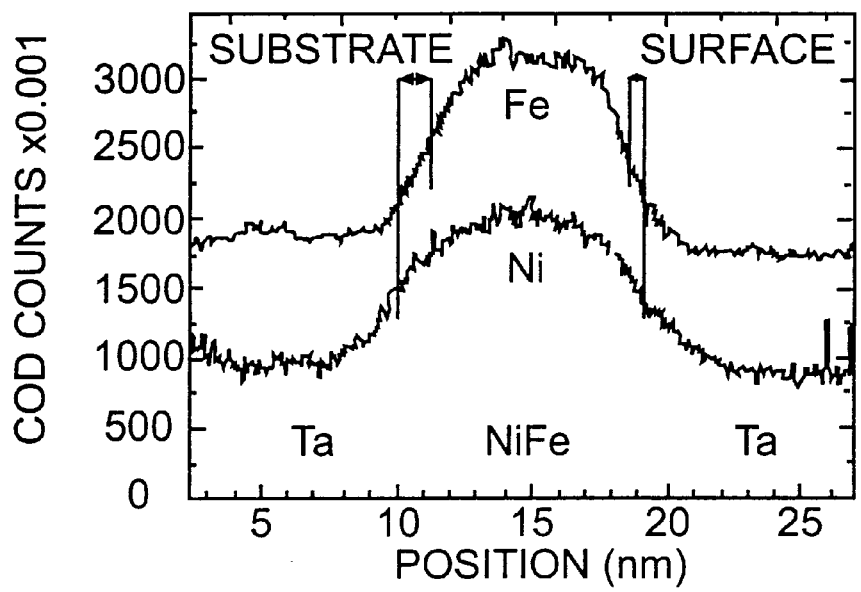
FIG. 3 is a graph representing the distribution of elements at the boundary between the Ta and NiFe layers after heat treatment.

In the MR and SV heads of the prior art, the composition of the head, as shown by the representative cross sectional diagrams illustrated in FIGS. 1A and 1B and FIG. 2, includes the deposition of a layer (the MR layer 51 of FIGS. 1A and 1B and the free layer 74 of FIG. 2) of which the principal component is NiFe and a layer (the spacer layer 53 of FIGS. 1A and 1B and the underlayer 65 of FIGS. 1B and 2) of which the principal component is Ta. In the area in which these layers contact each other, a diffusion area is created. The diffusion area results from the attraction between the layers and is caused in the formation of the layers during sputtering, if sputtering is used, and in the heat treatment or annealing step that follows the forming of the layers, (regardless of whether the layers are formed by sputtering). As a result, the magnetic property of the MR layer or free layer is deteriorated at the diffusion area. Thus, according to the present invention, an isolate layer that isolates the NiFe layer and the Ta layer is interposed between the layers to prevent the generation of the diffusion area during sputtering, if sputtering is used in the layer deposition process, and to prevent the generation of the diffusion area from the heat treatment(s) to thereby prevent the deterioration of the magnetic property of the MR layer or free layer, respectively.

Preferably, the isolate layer is one of the following:

1) a composition in which the principal component is a magnetic element that is not solid soluble with Ta,
2) a composition in which the principal component is a non-magnetic element that is not solid soluble with Ni and Fe,
3) a composition in which the principal component is at least one of the elements of Co, Fe, Ti, V, Zr, Nb, Mo, Hf, W, Tc, Ru, Rh, Pd, Ag, Re, Os, Ir, Pt and Au; or
4) a composition in which the principal component is of $Co_{(100-x)}Fe_{(x)}$, where $20 \geq X > 0$.

For $Co_{(100-x)}Fe_x$ (where $20 \geq X > 0$), the relation of $(100-X):X$ holds where the ratio of the number of the elements of the composites of Co and the Fe is in the range of 0 to 20. For example, for compositions within the range of approximately $Co_{99}Fe_1 \sim Co_{81}Fe_{19}$, $Co_{60}Fe_{20}$.

Further, Hf, Zr and Sn are examples of nonmagnetic elements that are not solid soluble with Ni and Fe. Each is useable as the principle component for the composition of the isolate layer, as mentioned above.

The isolate layer is formed of one of the foregoing compositions (1)–(4) and preferably has one of an amorphous composition, an fcc structure or an hcp structure that does not disturb the formation of the (111) crystal orientation of the MR or free layer, which is preferably essentially NiFe.

In the present invention, the isolate layer preferably has a principal component of magnetic or non-magnetic elements that is not solid soluble with the first and/or the second layers and is arranged between the first and second layers in a magnetic head of a layered structure that is formed with a first layer principally of NiFe and a second layer principally of Ta.

In other words, in the present invention, preferably a magnetic head has a layered structure having a first layer of which the principal component is NiFe and a second layer of which the principal component is Ta and between the first layer and second layer is interposed the isolate layer, of which the principal component is one or more of elements that do not diffuse with the elements that constitute the first and second layers in a heated state.

The preferred embodiments of the present invention are described in detail in the following.

FIRST EMBODIMENT

Figure 6:
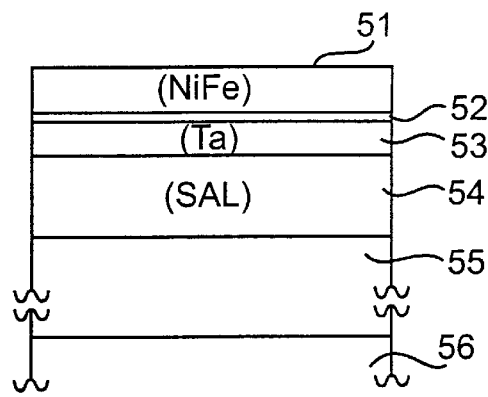
FIG. 6 is a representative cross sectional diagram showing the layer structure of an MR head, according to a first embodiment of the present invention.

The magnetoresistive (MR) head of the first preferred embodiment of the present invention is provided with, as is illustrated in the representative cross sectional diagram of FIG. 6, an MR layer 51 that is the magnetoresistive element, a transverse bias layer 54 that applies the transverse bias to the MR layer 51, a spacer layer 53 that separates the transverse bias layer 54 and the MR layer 51, an under part gap layer 55 and an under part shield layer 56 that are arranged under the transverse bias layer 54. An isolate layer 52 is provided, according to the first embodiment, between the MR layer 51 and the spacer layer 53.

Preferably, the MR layer 51 is essentially NiFe and the spacer layer 53 is essentially Ta. Further, isolate layer 52 is preferably one of a composition in which the principal component is a magnetic element that is not solid soluble with Ta, a composition in which the principal component is a non-magnetic element that is not solid soluble with Ni and Fe, a composition in which the principal component is at least one of the elements of Co, Fe, Ti, V, Zr, Nb, Mo, Hf, W, Tc, Ru, Rh, Pd, Ag, Re, Os, Ir, Pt and Au; or a composition in which the principal component is of $Co_{(100-x)}Fe_{(x)}$, where $20 \geq X > 0$.

The preferred thickness for the MR layer 51 is 10 to 15 nm, for the isolate layer 52 is 1 nm, for the spacer layer 53 is 5 nm, for the transverse bias layer 54 is 20 nm, for the under part gap layer is 1000 nm and for the under part shield layer is 2000 to 3000 nm.

Second Embodiment

Figure 7:
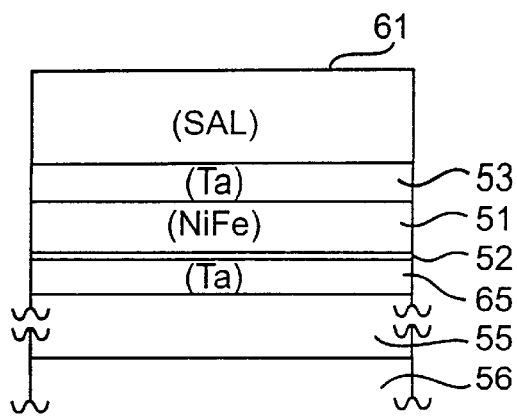
FIG. 7 is a representative cross sectional diagram showing the layer structure of an MR head according to a second embodiment of the present invention.

The magnetoresistive head of the second preferred embodiment is, as is illustrated by the representative cross sectional diagram of FIG. 7, of a layered structure that is inverted with respect to the under part gap layer 55 as compared with the MR head of FIG. 6. The MR head of the second embodiment has a transverse bias layer 61, a spacer layer 53 of which the principal component is Ta, an MR layer 51, an underlayer 65 of which the principal component is Ta, an under part gap layer 55 and an under part shield layer 56. Between the MR layer 51, of which the principal component is NiFe, and the underlayer 65, of which the principal component is Ta, is the isolate layer 52.

The preferred material of the isolate layer 52 is the same as that specified for the isolate layer in the first embodiment. Also, the thicknesses of each of the layers is similar to those of the first preferred embodiment.

Third Embodiment

Figure 8:
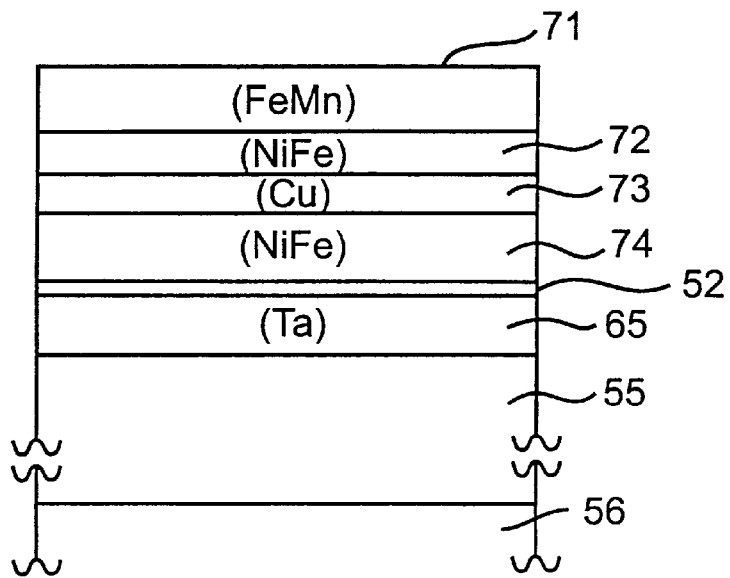
FIG. 8 is a representative cross sectional drawing showing the layer structure of a spin valve head according to a third embodiment of the present invention.
Figure 9:
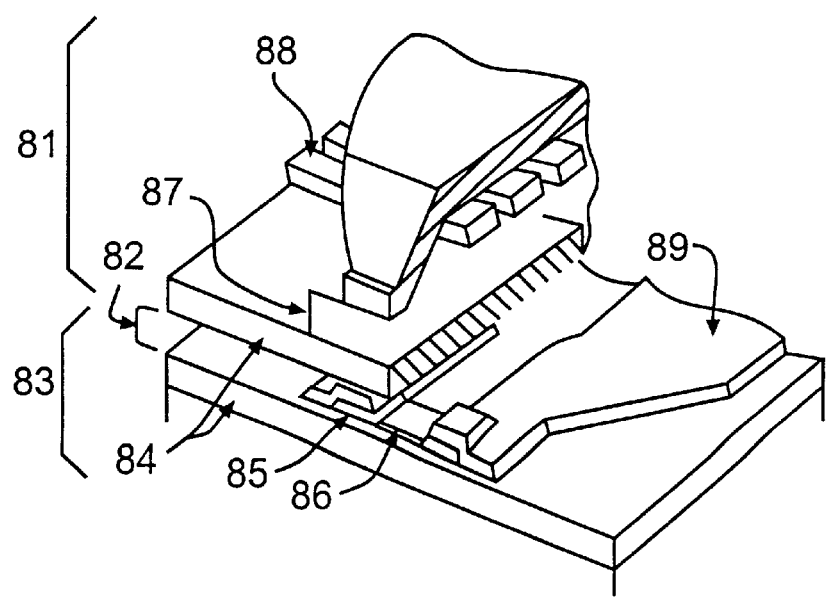
FIG. 9 illustrates a magnetic head arrangement according to the present invention.

The third preferred embodiment of the present invention is a spin valve head, as illustrated by the representative cross sectional diagram of FIG. 8. The SV head of the present embodiment has an antiferromagnetic layer 71 of which the principal component is, for example, FeMn, a pinned layer 72 that is made of a ferromagnetic material such as NiFe, a nonmagnetic, metallic layer 73 that is made of Cu, for example, a free layer 74 that is made of a ferromagnetic material such as NiFe, an underlayer 65, of which the principal component is Ta, an under part gap layer 55 and an under part shield layer 56.

Between the free layer 74 and the underlayer 65 is an isolate layer 52. Isolate layer 52 is preferably of a composition that is the same as that specified for the isolate layers in the first two embodiments.

The preferred thicknesses of the layers is as follows: for the antiferromagnetic layer 71, 5 to 30 nm; for the pinned layer 72, 2 to 3 nm; for the nonmagnetic layer 73, 2 to 3 nm; for the free layer 74, 5 to 7 nm; for the under part gap layer, 1000 nm; for the under part shield layer, 2000 to 3000 nm; and for the isolate layer 52, 1 nm.

All the layers including the isolate layer 52 in each of the preferred embodiments are preferably formed by a sputtering method in the presence of an applied magnetic field. Further, in each of the foregoing described preferred embodiments, the samples are heat treated twice in a magnetic field in a vacuum (an annealing process).

In particular, in the heat treatment processes, the sample is first heat treated while applying a magnetic field of 2 kOe in the direction of the hard axis of magnetization of the pinned layer 72, and then it is heat treated while applying a magnetic field of 2 kOe in the direction perpendicular to that of the first heat treatment step.

Figure 4:
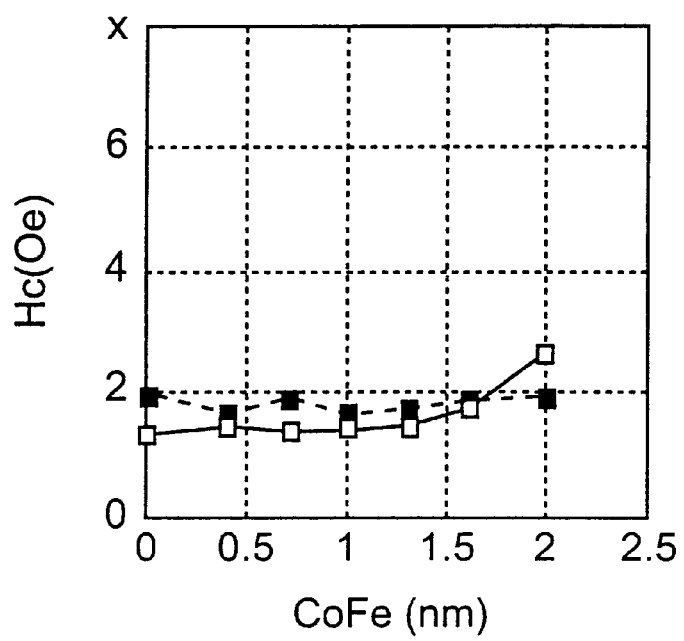
FIG. 4 is a graph representing the dependence of the coercivity in the direction of the hard magnetization axis on the thickness of the interposed CoFe layer (isolate layer) before and after heat treatment in the present invention.

The dependency of the coercive force of the free layer on the thickness of a CoFe layer when the external magnetic field is scanned in the direction of the hard axis of the free layer according to the preferred embodiment is shown by FIG. 4.

FIG. 4 is a graph showing the dependency of the coercive force on the thickness of the layer when the material of the isolate layer is CoFe. As understood from FIG. 4, when the isolate layer of CoFe is not present (the layer thickness is zero), the coercive force is increased from 1.3 Oe to 2.0 Oe as a result of the heat treatment. Note that the dashed line joining the filled square points represents data taken after the heat treatment, whereas the solid line joining the unfilled square points represents data taken before the heat treatment. On the other hand, when the CoFe (the isolate layer) is interposed between the NiFe and Ta layers, the increase of the coercive force by the heat treatment is reduced. As a result of the present invention, the coercive force of the magnetic head of the preferred embodiments is not increased by the heat treatment (annealing) and thus increases in noise can be prevented.

As observed from FIG. 4, the preferred range of the thickness of the CoFe isolate layer which does not increase the coercive force is about 0.4 to 1.6 nm.

Figure 5:
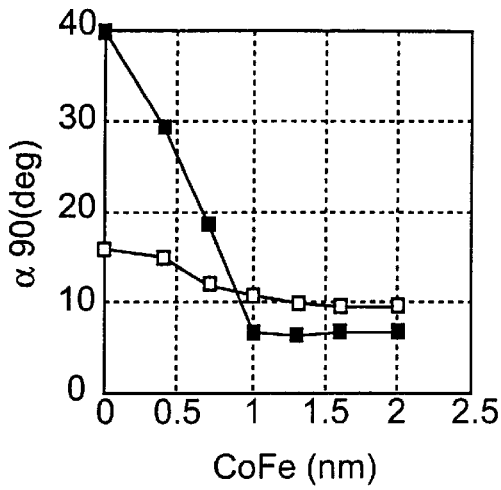
FIG. 5 is a graph representing the dependence of the value of α90 on the thickness of the interposed CoFe layer (isolate layer) before and after the heat treatment in the present invention.

FIG. 5 shows the result of the measurement of the dependency of $\alpha 90$ (a unit that indicates the dispersion of the direction of magnetization, wherein a larger value indicates greater dispersion and higher noise) on the thickness of the CoFe layer (the isolate layer). Note that the line joining the filled square points represents data taken after the heat treatment, whereas the line joining the unfilled square points represents data taken before the heat treatment.

As shown by the graph of FIG. 5, the $\alpha 90$ after the heat treatment is 40° without the interposed CoFe isolate layer (layer thickness of 0 nm) which indicates that the absence of the CoFe layer is the main cause of the increase in noise. On the other hand, the $\alpha 90$ after the heat treatment is decreased by the interposed CoFe isolate layer. In particular, when the thickness of the inserted CoFe layer is 1 nm or more, the $\alpha 90$ is decreased to 7°. Accordingly, the increase in the $\alpha 90$ by the heat treatment is suppressed by the interposed isolate layer and the noise is correspondingly reduced.

In the magnetic head of the preferred embodiments, by arranging the isolate layer between the first layer and the second layer of the MR and SV heads, which have a layered structure that is formed of a first layer of essentially NiFe and a second layer of essentially Ta, the deterioration of the soft-magnetic property of the diffusion area is prevented during a heat treatment step, such as during an annealing step of a manufacturing process. As a result, the magnetic characteristic is improved and the noise is reduced. Further, the isolate layer acts as a separation layer during sputtering deposition, if sputtering is used as the deposition technique, wherein without the isolate layer, a mixing of the adjacent NiFe and Ta layers occurs to an extent of up to about 1 nm of mixing.

In the description of the SV head provided herein, a layered structure having one free layer is described as the preferred embodiment, but the invention is equally applicable to a dual layered structure of the NiFe and CoFe layers.

Figure 10:
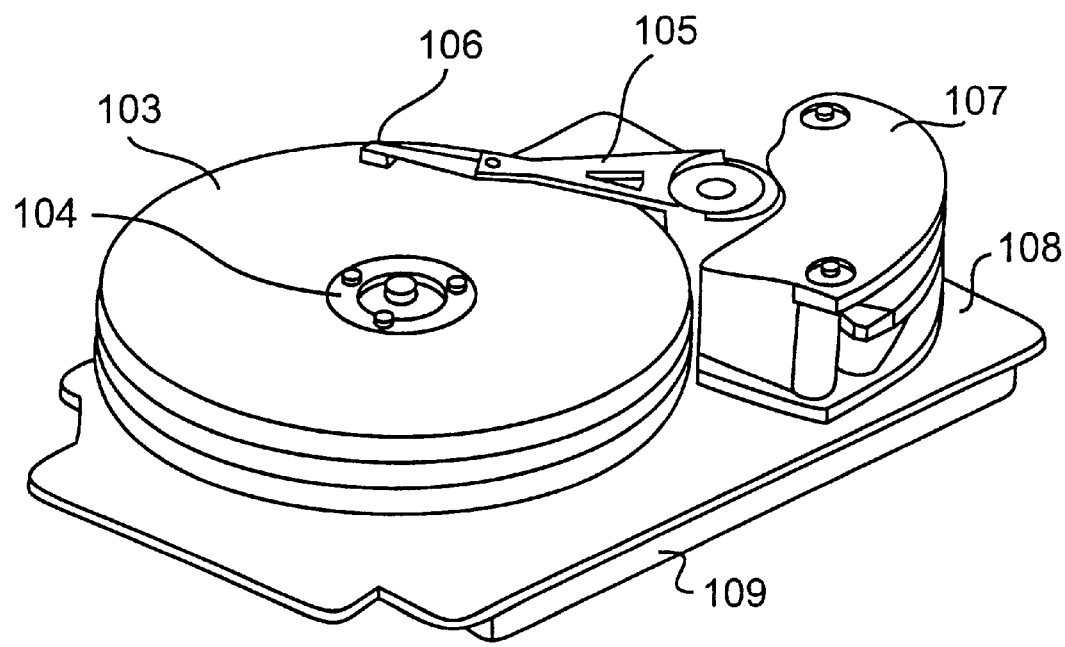
FIG. 10 shows a magnetic storage device having magnetic heads according to the preferred embodiments of the present invention.

FIG. 10 is a diagram of a magnetic storage device having MR and SV heads according to the present invention. As shown, the magnetic storage device comprises magnetic disk media 103 that are mounted at even intervals on a high precision spindle 104 that is rotating at a high rotational speed. A group of magnetic heads 106 are provided for recording and reproducing data on the magnetic media 103. The heads are held by the movable carriage 105 that is driven by a voice coil motor 107 for the high speed positioning of the carriage. A rigid base 108 supports these components.

The magnetic storage device is provided with a voice coil motor control circuit part that controls the voice coil motor 107 according to the signals sent from a host device. The device further has an interface part that exchanges the signals with the host device and a recording and reproducing processing part 109 that is provided with the read/write circuit that control the current which flows through the magnetic heads.

The magnetic head group 106 of the magnetic storage device of the preferred embodiment is a group of MR and SV heads constructed according to the preferred embodiments of the invention. Therefore, with the magnetic storage device of the preferred embodiments, a high recording density magnetic storage device with a small size, low cost and high reliability is realized.

As is described, the present invention provides a magnetoresistive head and spin valve head in which the soft magnetic property of the NiFe layer of a thickness of 10 nm or less is not deteriorated by a heat treatment (annealing) of the head during manufacturing. The head, as a result, has low noise and improved magnetic properties. In the head structure, an isolate layer is provided that consists essentially of a magnetic material that is not solid soluble with Ta, or a non-magnetic material that is not solid soluble with Ni and Fe, between a layer consisting essentially of NiFe and a layer consisting essentially of Ta.

The present invention is not limited to the foregoing preferred embodiments, and while preferred embodiments have been set forth with specific details, further embodiments, modifications and variations are contemplated according to the broader aspects of the present invention, all as determined by the spirit and scope of the following claims.

What is claimed is:

1. A magnetic head, comprising a layered structure having at least first and second layers and an isolate layer between said first and second layers, wherein said first layer is of a composition having a principal component of NiFe and said second layer is of a composition having a principal component that is essentially Ta.

2. A magnetic head according to claim 1, wherein said isolate layer is of a composition in which the principal component is a magnetic element that is not solid soluble with Ta.

3. A magnetic head according to claim 1, wherein said isolate layer is of a composition in which the principal component is a nonmagnetic element that is not solid soluble with Ni and Fe.

4. A magnetic head according to claim 1, wherein said isolate layer consists essentially of one or more of the elements of Co, Fe, Ti, V, Zr, Nb, Mo, Hf, W, Tc, Ru, Rh, Pd, Ag, Re, Os, Ir, Pt and Au.

5. A magnetic head according to claim 1, wherein said isolate layer consists essentially of $Co_{(100-x)}Fe_x$ (where $20 \geq X > 0$).

6. A magnetoresistive head comprising a layered structure, including a magnetoresistive layer having a principal component of NiFe and a transverse bias layer that applies transverse bias to the magnetoresistive layer, a spacer layer between said transverse bias layer and said magnetoresistive layer having a principal, component of essentially Ta and an isolate layer between said spacer layer and said magnetoresistive layer.

7. A magnetoresistive head according to claim 6, wherein said isolate layer is of a composition in which the principal. component is a magnetic element that is not solid soluble with Ta.

8. A magnetoresistive head according to claim 6, wherein said isolate layer is of a composition in which the principal component is a nonmagnetic element that is not solid soluble with Ni and Fe.

9. A magnetoresistive head according to claim 6, wherein said isolate layer consists essentially of one or more of the elements of Co, Fe, Ti, V, Zr, Nb, Mo, Hf, W, Tc, Ru, Rh, Pd, Ag, Re, Os, Ir, Pt and Au.

10. A magnetoresistive head according to claim 6, wherein said isolate layer consists essentially of $Co_{(100-x)}Fe_x$ (where $20 \geq X > 0$).

11. A magnetoresistive head comprising a layered structure, including a magnetoresistive layer having a principal component of essentially NiFe, a transverse bias layer for applying a transverse bias to said magnetoresistive layer, a spacer layer between said magnetoresistive layer and said transverse bias layer, an underlayer having a principal component of essentially Ta and an isolate layer interposed between said magnetoresistive layer and sid underlayer.

12. A magnetoresistive head according to claim 11, wherein said isolate layer is of a composition in which the principal component is a magnetic element that is not solid soluble with Ta.

13. A magnetoresistive head according to claim 11, wherein said isolate layer is of a composition in which the principal component is a nonmagnetic element that is not solid soluble with Ni and Fe.

14. A magnetoresistive head according to claim 11, wherein said isolate layer consists essentially of one or more of the elements of Co, Fe, Ti, V, Zr, Nb, Mo, Hf, W, Tc, Ru, Rh, Pd, Ag, Re, Os, Ir, Pt and Au.

15. A magnetic head according to claim 11, wherein said isolate layer consists essentially of $Co_{(100-x)}Fe_x$ (where $20 \geq X > 0$).

16. A spin valve magnetic head having a layered structure, including an antiferromagnetic layer adjacent a pinned magnetic layer, each of which being primarily of a ferromagnetic material, a free layer and a non-magnetic, metallic layer arranged between the pinned layer and the free layer, wherein the free layer has a principal component of essentially NiFe and is formed with an underlayer having a principal component of Ta and wherein an isolate layer is formed between said underlayer and said free layer.

17. A spin valve head according to claim 16, wherein said isolate layer is of a composition in which the principal component is a magnetic element that is not solid soluble with Ta.

18. A spin valve head according to claim 16, wherein said isolate layer is of a composition in which the principal component is a nonmagnetic element that is not solid soluble with Ni and Fe.

19. A spin valve head according to claim 16, wherein said isolate layer consists essentially of one or more of the elements of Co, Fe, Ti, V, Zr, Nb, Mo, Hf, W, Tc, Ru, Rh, Pd, Ag, Re, Os, Ir, Pt and Au.

20. A magnetic head according to claim 16, wherein said isolate layer consists essentially of $Co_{(100-x)}Fe_x$ (where $20 \geq X > 0$).

21. A magnetic storage device provided with one or more magnetic heads according to claim 1, wherein the magnetic storage device includes at least one rotatable magnetic disk from which said magnetic heads reproduce data.

22. A magnetic storage device provided with one or more magnetoresistive heads according to claim 6, wherein the magnetic storage device includes at least one rotatable magnetic disk from which said magnetic heads reproduce data.

23. A magnetic storage device provided with one or more magnetoresistive heads according to claim 11, wherein the magnetic storage device includes at least one rotatable magnetic disk from which said magnetic heads reproduce data.

24. A magnetic storage device provided with one or more spin valve heads according to claim 16, wherein the magnetic storage device includes at least one rotatable magnetic disk from which said magnetic heads reproduce data.

25. A magnetoresistive or spin valve head having a layered structure including a magnetoresistive layer consisting essentially of NiFe, a transverse bias layer on a substrate or underlayer that applies a transverse bias to the magnetoresistive layer, a spacer layer on the transverse bias layer that magnetically separates the transverse bias layer and the magnetoresistive layer, wherein the spacer layer consists essentially of Ta, further including an isolate layer between the spacer layer and the magnetoresistive layer.

* * * * *